United States Patent [19]
Takahashi et al.

[11] Patent Number: 5,717,975
[45] Date of Patent: Feb. 10, 1998

[54] METHOD OF AND APPARATUS FOR THE PRODUCTION OF PHOTOGRAPHIC PROOFS

[75] Inventors: Hiroshi Takahashi, Atami, Japan; Hans-Juergen Rauh, Strasslach-Hailafing; Hans-Georg Schindler, Holzkirchen, both of Germany

[73] Assignee: Agfa-Gevaert Aktiengesellschaft, Leverkusen, Germany

[21] Appl. No.: 485,401

[22] Filed: Jun. 7, 1995

[30] Foreign Application Priority Data

Jul. 13, 1994 [DE] Germany .......... 44 24 688.9

[51] Int. Cl.⁶ .................................. G03B 27/46
[52] U.S. Cl. .................... 355/43; 355/1; 355/77
[58] Field of Search .................. 355/40, 41, 43, 355/54, 61, 77, 1

[56] References Cited

U.S. PATENT DOCUMENTS

| | | |
|---|---|---|
| 4,279,502 | 7/1981 | Thurm et al. |
| 4,591,263 | 5/1986 | Fergg .......... 355/43 |
| 5,016,044 | 5/1991 | Tokuda ......... 355/43 |
| 5,122,832 | 6/1992 | Iwashita et al. ......... 355/41 |

FOREIGN PATENT DOCUMENTS

| | | |
|---|---|---|
| 0 632 316 A1 | 1/1995 | European Pat. Off. |
| 2 343 582 | 3/1974 | Germany . |
| 37 34 643 A1 | 4/1988 | Germany . |
| 40 03 806 A1 | 8/1990 | Germany . |
| 41 08 815 A1 | 9/1992 | Germany . |
| 2-46440 | 2/1990 | Japan ......... 355/40 |

*Primary Examiner*—Joan H. Pendegras
*Attorney, Agent, or Firm*—Darby & Darby

[57] ABSTRACT

A filmstrip consisting of a series of coherent frames is passed through a copying station where images of the frames are projected onto an elongated band of copying paper to make proofs of the frames. The images are projected in such a manner that the relative orientations of the images are the same as the relative orientations of the frames.

11 Claims, 4 Drawing Sheets

METHOD OF AND APPARATUS FOR THE PRODUCTION OF PHOTOGRAPHIC PROOFS

CROSS-REFERENCE TO RELATED APPLICATION

This application contains subject matter similar to that disclosed in commonly-owned application Ser. No. 08/479, 708 filed Jun. 7, 1995 and entitled "Method of and Apparatus for Making Photographic Proofs" now abandoned.

BACKGROUND OF THE INVENTION

The invention relates generally to the copying of masters.

In certain situations, it is desirable to make proofs of the frames of an exposed and developed strip of film. The proofs are generally made using a contact printing process in which images of the frames are produced on a strip of copying material. Due to the nature of the contact printing process, the images have the same relative positional relationships as the frames. The strip of proofs makes it possible to evaluate the pictures on the film, the positions of the pictures in the individual frames and the sequence in which the pictures were taken.

In the contact printing process, the frame of a film and the image of the frame on the copying material have the same size. For small 24 mm×36mm frames, little detail can be seen in the images with the naked eye. Even a small magnification of 20% or 30% is not possible. Furthermore, most copying establishments for film have no modern equipment for exposure control during the production of a strip of proofs. Hence, the quality of the proofs frequently leaves something to be desired as regards color and density.

The roll copiers which are frequently employed in processing laboratories for the making of final prints have both magnification and exposure control capability. However, these copiers form images by projection. Since an image produced in this manner is rotated 180 degrees in its plane, confronting edges of two neighboring frames of a film face away from one another on the copying material, i.e., the edges are separated from each other on the copying material by two images. Accordingly, if a strip of proofs were made by projection, it would be very difficult to determine the sequence in which the pictures corresponding to the proofs were taken.

SUMMARY OF THE INVENTION

It is an object of the invention to provide a method which enables a master to be readily evaluated from a proof formed by projection.

Another object of the invention is to provide a method which allows the order of a plurality of masters to be easily determined on the basis of proofs generated by projection.

An additional object of the invention is to provide an apparatus which permits a master to be readily judged from a projected proof of the master.

A further object of the invention is to provide an apparatus which makes it possible for the sequence of a plurality of masters to be easily established from an examination of proofs produced by projection.

The preceding objects, as well as others which will become apparent as the description proceeds, are achieved by the invention.

One aspect of the invention resides in a copying method which comprises the step of making at least one proof of at least one master. The making step includes projecting an image of the master onto an image-recording medium so that the image has the same orientation as the master.

An identifying character may be associated with the master, and the method can then further comprise the step of projecting an image of the character onto the image-recording medium so that the image of the character has the same orientation as the character.

If the master is coherent with at least one other master, the method may additionally comprise the steps of conveying the masters along a first path in a predetermined direction, and conveying the image-recording medium along a second path in such direction. The paths here pass through a projecting location, and the making step involves projecting images of the various masters onto the image-recording medium at the projecting location so that the images have the same relative orientations as the masters. Projection of the images is performed during the conveying steps.

The projection of an image can be carried out using a lens unit which rotates the image 360 degrees, i.e., a lens unit which rotates the image 180 degrees beyond the 180 degree rotation normally occurring during projection. By employing a lens unit of this type, the image will have the same orientation as the master, similarly to the contact printing process, even when the master and the image-recording medium are transported in the same direction as is customary in photographic roll copiers.

Another aspect of the invention resides in a copying method which comprises the step of making proofs of a plurality of coherent masters. Such making step includes projecting images of the masters onto an image-recording medium so that the images have the same relative orientations as the masters.

In the event that identifying characters are associated with the respective masters, the instant method aspect of the invention further comprises the step of projecting images of the characters onto the image-recording medium so that images of the characters have the same relative orientations as the characters.

The present method aspect can additionally comprise the steps of conveying the masters along a first path in a first direction, and conveying the image-recording medium along a second path in a second direction counter to the first direction. The paths pass through a projecting location, and projection of the images is performed at this location during the conveying steps.

By conveying the image-recording medium countercurrent to the masters, a simple lens unit or objective can be used to form the images such that image edges corresponding to confronting edges of two neighboring masters also confront one another, i.e., such that the images have the same relative orientations as the masters.

An additional aspect of the invention resides in a copying apparatus. The apparatus comprises first means for positioning masters in a first zone of a predetermined location, second means for positioning portions of an image-recording medium in a second zone of the predetermined location, and means at such location for projecting to the second zone images of masters in the first zone. The projecting means, which constitutes part of a means for making proofs of the masters on the image-recording medium, projects the images in such a manner that the images have the same orientations as the masters.

A further aspect of the invention again resides in a copying apparatus. As before, the apparatus comprises first means for positioning masters in a first zone of a predetermined location, second means for positioning portions of an image-recording medium in a second zone of the predetermined location, and means at such location for projecting to the second zone images of masters in the first zone. The projecting means once more constitutes part of a means for making proofs of the masters on the image-recording medium. In this apparatus aspect of the invention, the first means, second means and projecting means permit the images to have the same relative orientations as the masters.

Additional features and advantages of the invention will be forthcoming from the following detailed description of preferred embodiments when read in conjunction with the accompanying drawings.

DESCRIPTION OF THE PREFERRED EMBODIMENTS

Figure 1:
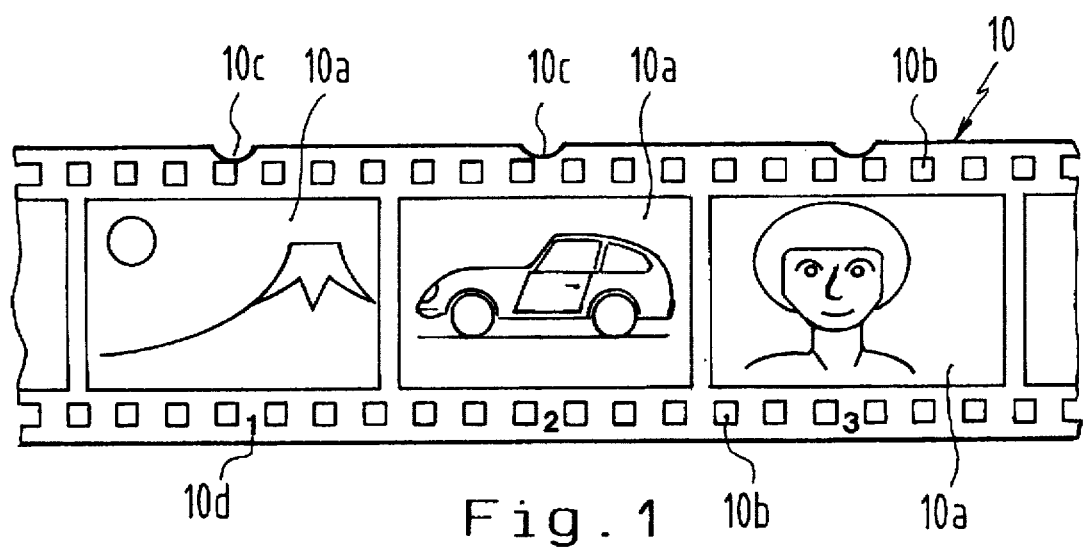
FIG. 1 shows a segment of a strip of coherent masters.

Referring to FIG. 1, a segment of an exposed and developed strip or length of film 10 is shown. The film 10, which is here a negative, contains a series of coherent frames or masters 10a which are identified by numerals or characters 10d located adjacent the respective frames 10a in one of the longitudinal margins of the film 10. Three frames 10a are illustrated and are associated with the numerals 1, 2 and 3, respectively. The frame 1 carries a picture of a mountain and the sun, the frame 2 a car, and the frame 3 a person. A row of perforations 10b extends along each of the longitudinal margins, and serves for transport, of the film 10. One of the longitudinal edges of the film 10 is formed with notches 10c, and each of the notches 10c is disposed alongside a respective frame 10a. The notches 10c function to permit detection of the positions of the frames 10a.

The identifying numbers 10d are exposed on the film 10 by the manufacturer. In conventional 135 size film with small frames, a bar code is exposed next to each identifying numeral 10d and expresses the respective identifying numeral 10d in a machine readable form.

The invention is applicable to a variety of films including those, such as 110 and 126 size film, which can be processed in a roll copier or printer.

In FIG. 1, the frames 10a are arranged so that the identifying numbers 10d increase from left to right. The right edge of a frame 10a with a given identifying number 10d is situated next to the left edge of the frame 10a with the next highest identifying number 10d.

If proofs of the frames 10a were to be made by means of a conventional contact printing process, a length or strip of coherent proofs would be obtained in which the proofs are identical to the frames 10a as regards size and content. However, the densities would be reversed as is normal between negative and positive.

Figure 2:
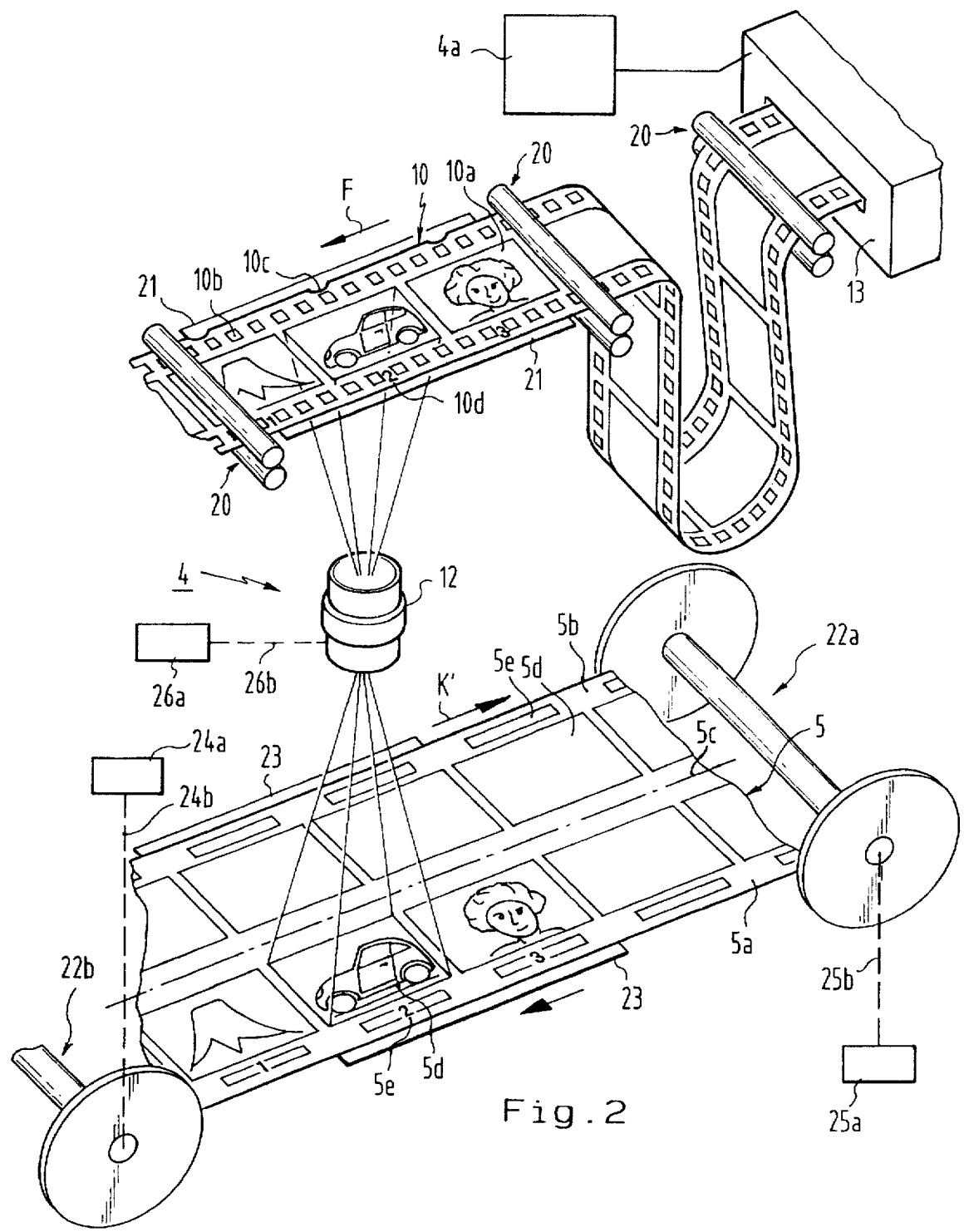
FIG. 2 illustrates a copying apparatus in accordance with the invention.

In accordance with the invention, proofs or images of the frames 10a are made by projection, as shown in FIG. 2, rather than by contact.

FIG. 2 schematically illustrates an apparatus according to the invention for making proofs. The apparatus is here a photographic roll copier or printer which can be largely of conventional construction. In such a copier, an exposed and developed filmstrip is unwound from a first film reel, transported through a scanning station and a copying station in a predetermined direction along a predetermined film path, and wound onto a second film reel. Concurrently, an elongated image-recording medium or band of copying paper is unwound from a first paper reel, transported through the copying station in the predetermined direction and along a predetermined paper path which is spaced from the film path, and wound onto a second paper reel. In the copying station, images of the frames of the filmstrip are projected onto the copying paper by means of a lens unit in the form of an objective. The filmstrip is normally constituted by a series of individual films which are spliced together end-to-end.

The film 10 of FIG. 1 which can, for instance, have 36 frames, constitutes part of a filmstrip in FIG. 2 where the film 10 is spliced to another film at either end. The film 10 is unwound from a non-illustrated reel and conveyed in a direction F along an elongated film path by transporting rollers 20. The film 10 passes through a photoelectric scanner 13 where each frame 10a of the film 10 is scanned in the three primary colors red, green and blue at each of a multiplicity of points arranged in columns and rows. The scanner 13 generates density values which are sent to an exposure control unit 4a. Based on the density values for the entire film 10 and the individual frames 10a, the exposure control unit 4a calculates the amounts of copying light required for the different frames 10a in each of the primary colors red, green and blue. The calculations can be performed, for example, in accordance with the teachings of the German patent 28 40 287.

Downstream of the scanner 13, the film 10 enters a copying or printing station 4. The copying station 4 is equipped with guides 21 for the film 10, and the guides 21 function to properly position the film 10 in, and to guide the film 10 along, the film path. The film path is looped between the scanner 13 and the copying station 4, and the loop serves as a temporary storage area for the film 10. The length of the loop is such that the leading frame 10a of the film 10 does not enter the copying station 4 until the entire film 10 has been scanned.

An elongated image-recording medium or band of copying paper 5 is transported along an elongated paper path between two reels 22a and 22b. The paper path, which is spaced from the film path, extends through the copying station 4 where the film path runs directly above and parallel to the paper path. The copying station 4 is provided with guides 23 for the copying paper 5, and the guides 23 serve to properly position the copying paper 5 in, and to guide the copying paper 5 along, the paper path.

The width of the copying paper 5 is at least twice the desired height or width of the proofs, that is, the desired length of the proofs as considered perpendicular to the paper path. The copying paper 5 has a longitudinal center line 5c, a strip-like portion 5a to one side of the center line 5c, and a strip-like portion 5b to the other side of the center line 5c. Each of the strip-like portions 5a, 5b extends longitudinally of the copying paper 5 and the paper path. The strip-like portion 5a travels along one longitudinally extending, strip-like section or portion of the paper path whereas the strip-like portion 5b travels along another longitudinally extending, strip-like section or portion of the paper path. The paper path has a center line which coincides with the center line 5c of the copying paper 5 so that the two strip-like sections of the paper path lie on opposite sides of the center line of such path.

When a proof of a frame 10a is to be made, the frame 10a is positioned in the copying station 4 so that it lies in the optical path. Copying light from a non-illustrated light source is passed through the frame 10a and is focused on an area or region 5d of the copying paper 5 by a lens unit 12 which includes or constitutes an objective. Thus, an image or copy of the frame 10a is formed on the copying paper by projection.

The copying station 4 constitutes a projecting location of the apparatus. The film guides 21 bound a zone of the copying station 4 in which the master 10a is positioned for copying. Similarly, the paper guides 23 bound a zone of the copying station 4 in which the image area 5d of the copying paper 5 is positioned for copying.

Prior to arrival of the frame 10a at the copying station 4, the exposure control unit 4a calculates the amount of copying light required for the frame 10a in each of the primary colors red, green and blue. During copying, the exposure control unit 4a moves non-illustrated color filters into the optical path between the frame 10a and the source of copying light so as to achieve the proper amounts of red, green and blue light. The source of copying light and the filtering arrangement can be constructed, for instance, as described in the German patent 28 40 287. However, the filtering arrangement and the source of copying light could also be designed in a completely different manner.

Figure 3:
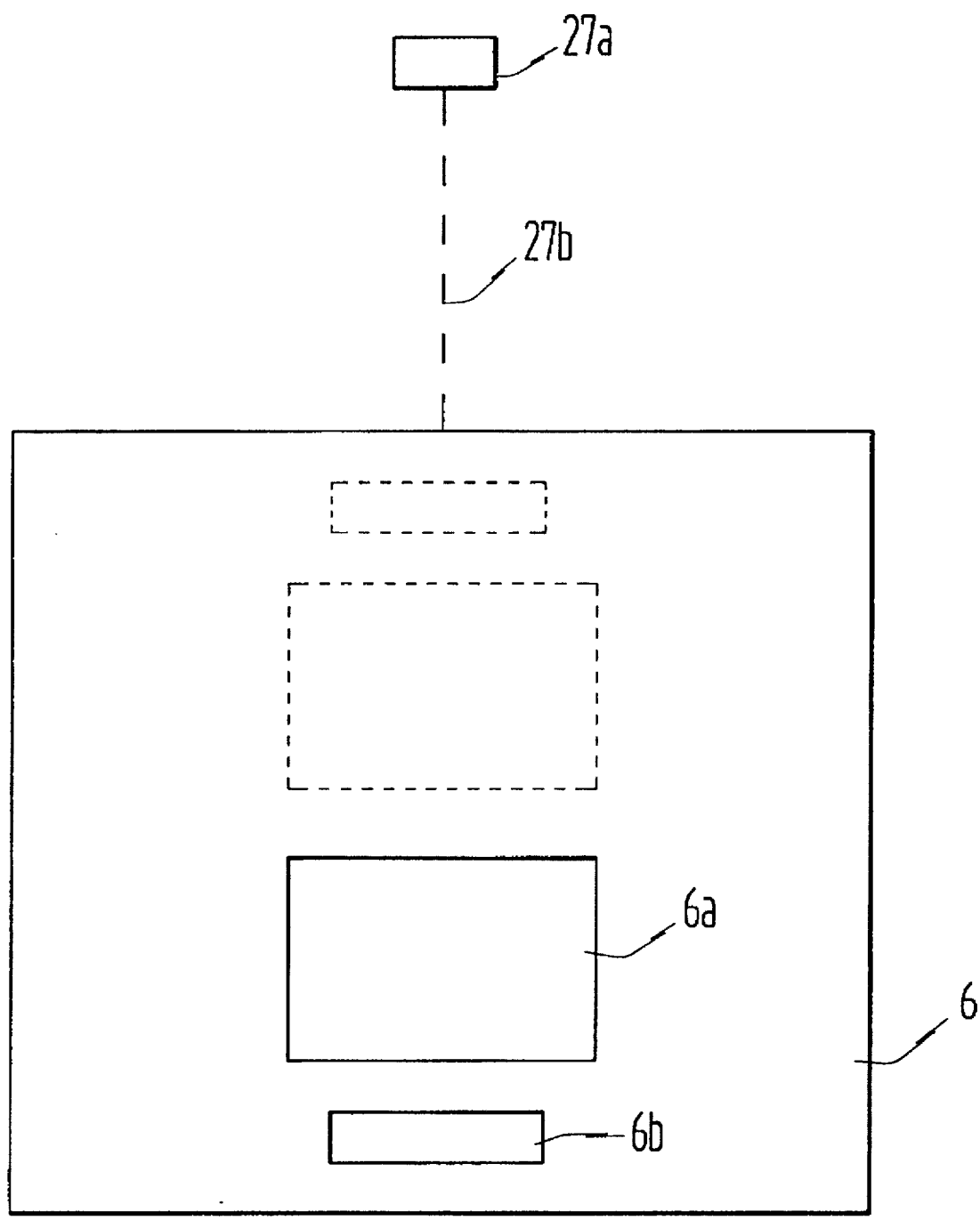
FIG. 3 shows a mask for use in the apparatus of FIG. 2.

Intermediate the lens unit 12 and the paper path is a mask 6 for the copying paper 5. The mask 6, which is shown in FIG. 3, has an opening 6a arranged to frame the image area 5d of the copying paper 5. The mask 6 further has a second, slot-like opening 6b next to the opening 6a, and the slot-like opening 6b is designed to frame an area or region 5e of the copying paper 5. The area 5e is located adjacent the image area 5d in that longitudinal margin or marginal portion of the copying paper 5 which runs alongside the image area 5d. The identifying number 10d of the frame 10a being copied is imaged onto the area 5e.

The mask openings 6a, 6b are located off-center of the mask 6, the copying paper 5 and the paper path. Thus, the mask 6 has a center line which cooperates with the center line 5c of the copying paper 5 to define a plane normal to the paper path and to the copying paper 5, and the mask openings 6a, 6b are situated to one side of the mask center line as well as to one side of the copying paper center line 5c and the paper path center line. The mask openings 6a, 6b are arranged to register with one of the strip-like portions 5a, 5b of the copying paper 5 and with the corresponding strip-like section of the paper path.

On the strip-like portion 5a or 5b which is in alignment with the mask openings 6a, 6b, the mask 6 covers the areas or regions of the copying paper 5 immediately upstream and downstream of the image area 5d and the number area 5e. The mask 6 additionally covers all that part of the second strip-like portion 5b or 5a located next to the image area 5d and next to the covered areas of the first strip-like portion 5a or 5b.

The lens unit 12 is positioned so that the image of the frame 10a being copied is projected onto the image area 5d of the copying paper 5 via the mask opening 6a. On the other hand, the identifying number 10d of the frame 10a is projected onto the number area 5e by way of the mask opening 6b. Since the mask openings 6a, 6b, which are in alignment with the image area 5d and number area 5e of the copying paper 5, are off-center with respect to the copying paper center line 5c, the image of the frame 10a being copied, as well as the identifying number 10d of the frame 10a, are projected onto the copying paper 5 off-center.

In FIG. 2, the copying paper 5 is oriented so that the image area 5d and number area 5e framed by the mask openings 6a, 6b are located on the strip-like portion 5a of the copying paper 5. Assuming this to be the initial orientation of the copying paper 5, and assuming that the reels 22a and 22b are interchangeable and that the copying paper 5 is initially wound on the reel 22a, one mode of operation of the copier of FIG. 2 is as follows:

The film 10 is advanced in the direction F to bring a frame 10a into the optical path of the copying station 4. The copying station 4 may be equipped with a non-illustrated mask having a window which is arranged to outline the frame 10a. The notch 10c associated with the frame 10a is sensed by a suitable, non-illustrated detector in order to accurately position the frame 10a in the copying station 4.

The copying paper 5 is unwound from the reel 22a and conveyed in a direction K so that an unexposed image area 5d and an unexposed number area 5e are brought into the copying station 4. To advance the copying paper 5 in the direction K, the leading end of the copying paper 5 may be attached to the reel 22b which is then driven by a motor 24a via a linkage 24b.

An image of the frame 10a in the copying station 4 is now projected onto the unexposed image area 5d while the identifying number 10d for the frame 10a is projected onto the unexposed number area 5e. The exposure control unit 4a regulates the amounts of copying light in the primary colors as a function of the size of the image area 5d. Since the image area 5d is relatively small, the amounts of copying light are also relatively small so that the frame 10a is copied onto the image area 5d very quickly.

A non-illustrated shutter initiates and terminates the exposure. Once the exposure has been terminated, the film 1 is advanced by a step in the direction F to bring the next frame 10a into the copying station 4. Likewise, the copying paper 5 is advanced by a step in the direction K to bring another unexposed image area 5d and another unexposed number area 5e into the copying station 4. The distance moved by the copying paper 5 during a step equals the length of an image area 5d as considered in the direction K plus the desired spacing between neighboring image areas 5d. As the copying paper 5 is transported in the direction K, the copying paper 5 is wound onto the reel 22b.

After the film 10 and copying paper 5 have been advanced by a step, the new frame 10a in the copying station 4 is copied together with its identifying number 10d. The film 10 and copying paper 5 are then each advanced by another step.

The foregoing procedure is repeated until the reel 22b is full or almost full at which time copying of the frames 10a is interrupted. It is preferred to interrupt copying at a splice between two films of the filmstrip containing the film 10 or at the end of the filmstrip. The reel 22b is thereupon interchanged with the now-empty reel 22a. Hence, the former take-off reel 22a becomes the take-up reel whereas the former take-up reel 22b becomes the take-off reel.

By interchanging the reels 22a and 22b, the orientation of the copying paper 5 is reversed. The previous leading end of the copying paper 5, which is currently at the center of the reel 22b and of the roll of copying paper 5 wound onto such reel, becomes the trailing end whereas the previous trailing end becomes the leading end and is attached to the reel 22a. Furthermore, the exposed strip-like portion 5a and unexposed strip-like portion 5b of the copying paper 5 have changed places. Thus, the unexposed strip-like portion 5b moves along the section of the paper path previously traveled by the strip-like portion 5a, and vice versa.

After the reels 22a and 22b have been interchanged, additional images are formed on the unexposed strip-like portion 5b in the same manner described earlier for the strip-like portion 5a. A filmstrip is advanced stepwise along the film path in the direction F while the copying paper 5 is advanced stepwise along the paper path in the direction K. Although the copying paper 5 is conveyed along the paper path in the same direction as before, the direction of movement of the copying paper 5 as seen from the perspective of the copying paper 5 is counter to its earlier direction of movement. From the perspective of the copying paper 5, the copying paper 5 is currently traveling in the direction K whereas it previously traveled in the direction K'.

Once all of the copying paper 5 has been unwound from the reel 22b and wound onto the reel 22a, the reel 22a can be removed from the apparatus and sent to a developing unit. Following development of the copying paper 5, the copying paper 5 is cut along the center line 5c, e.g., by means of a conventional slitter, to separate the strip-like portions 5a and 5b from one another. Each of the strip-like portions 5a, 5b can then be packaged together with the corresponding filmstrip. The strip-like portions 5a, 5b can be packaged in the form of rolls or, alternatively, can be cut into shorter, straight strips prior to packaging, e.g., strips made up of six coherent proofs.

If the lens unit 12 were constituted by an objective of the type conventionally used in roll copiers, the proofs would be rotated 180 degrees relative to the frames 10a. For instance, the frame 10a of FIG. 1 identified by 1 is oriented such that the sun and the left side of the mountain are remote from the car identified by 2. Similarly, the rear of the car is remote from the mountain. In the event that an objective of the kind normally used in roll copiers were employed for the lens unit 12 while the film 10 and the copying paper 5 are conveyed in the same direction as shown, the sun and the left side of the mountain would be adjacent the rear of the car on the copying paper 5. This would make it difficult for a customer to distinguish a desired frame 10a, e.g., for a back order.

Figure 4:
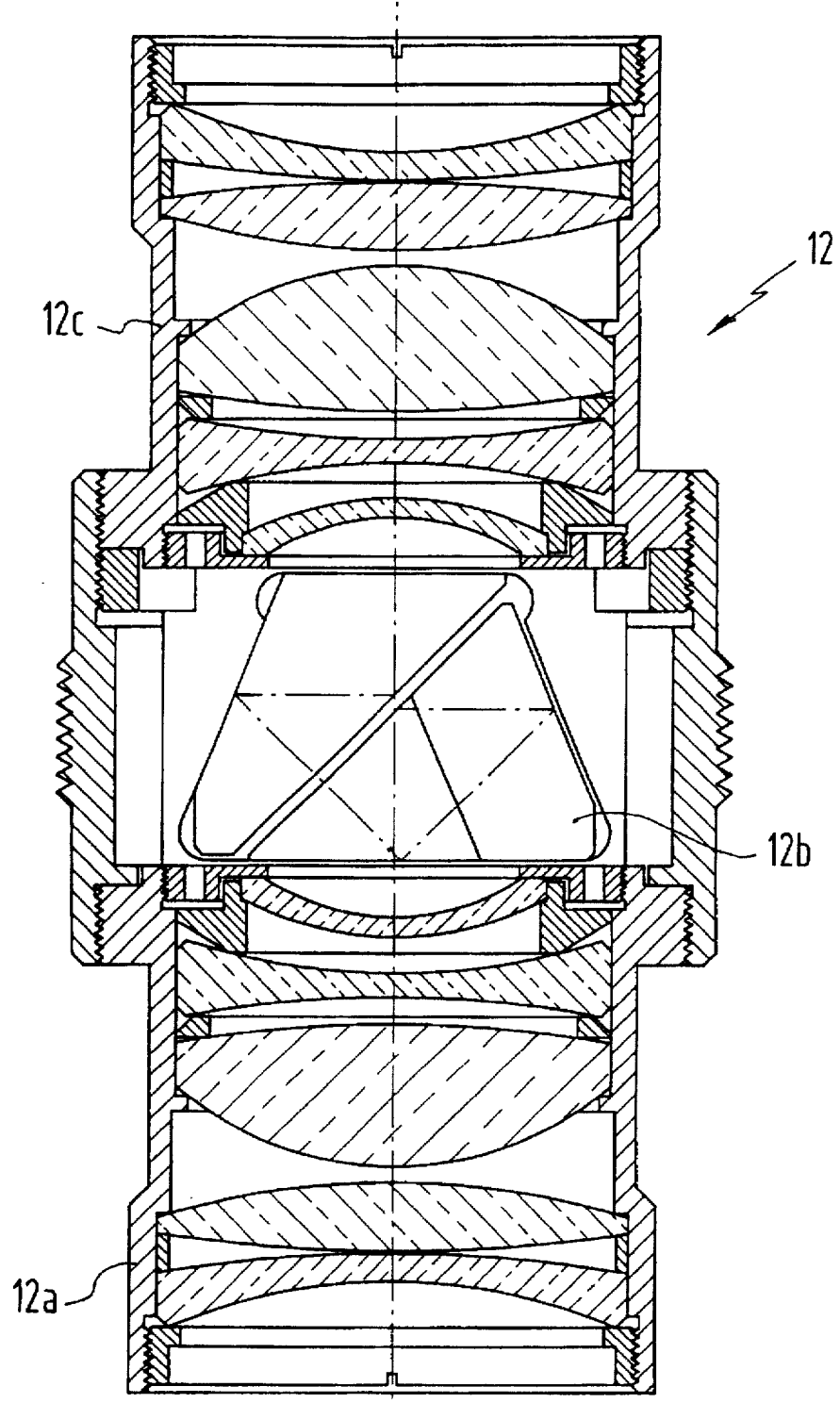
FIG. 4 illustrates a lens unit for use in the apparatus of FIG. 2.

To avoid this problem, the lens unit 12 is not constituted by a normal objective which rotates images through 180 degrees. Rather, a special objective illustrated in FIG. 4 is employed for the lens unit 12. This special lens unit 12 includes an objective section 12a which faces the copying material 5, an objective section 12c which is spaced from the objective section 12a and faces the film 10, and a Schmidt-Pechan prism 12b between the objective sections 12a and 12c. The Schmidt-Pechan prism 12b, which has sides sloping like a roof, rotates images 180 degrees more than the customary 180 degree rotation so that the images on the copying paper 5 have been rotated 360 degrees and have the same orientations as the frames 10a of the film 10.

Figure 5:
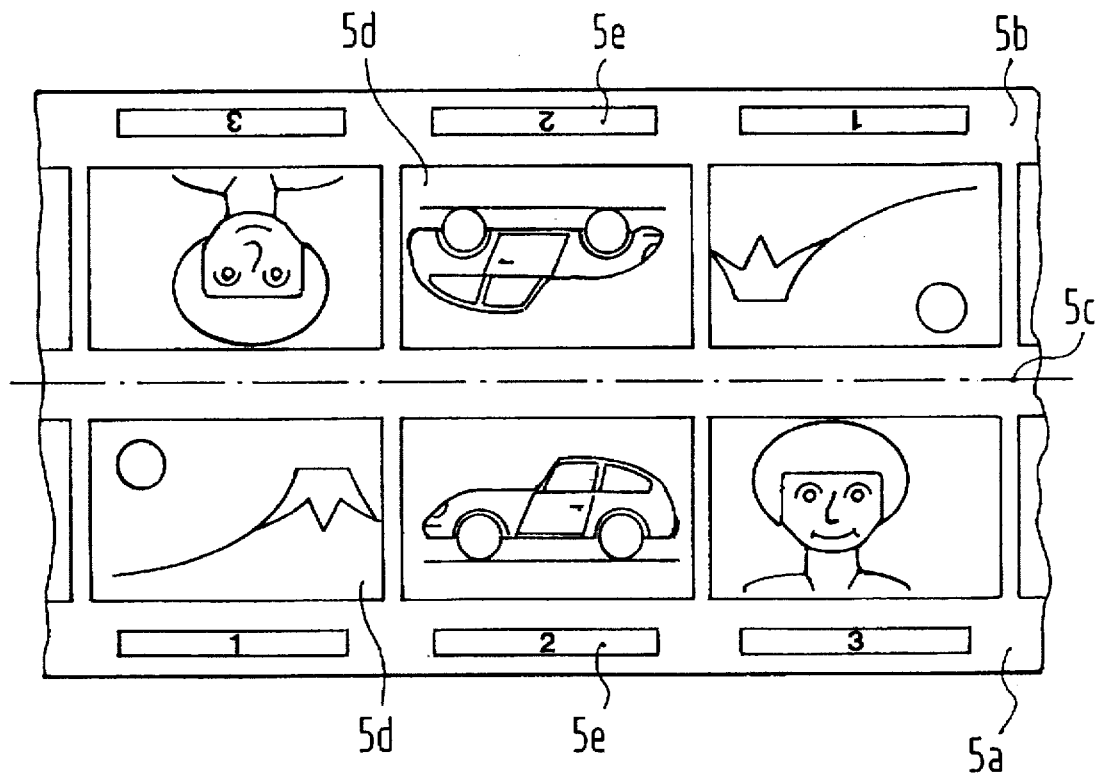
FIG. 5 shows a segment of an exposed and developed image-recording medium with images of the masters of FIG. 1.

FIG. 5 shows a segment of the copying paper 5 following exposure and development. The strip-like portions 5a, 5b of the segment each contain three images and, for the purpose of illustration, the three images in both cases are images of the frames 10a identified 1, 2 and 3. It will be observed that the orientations of the images are identical to the orientations of the frames 10a and that the images have the same relative orientations as the frames 10a.

A similar relative orientation for neighboring frames 10a and corresponding projected images of the frames 10a can be obtained without a Schmidt-Pechan prism by changing the direction of movement of the copying paper 5 relative to the film 10. This can be achieved, for example, in that the film 10 is conveyed in the direction F as before while the direction of movement of the copying paper 5 is reversed so that the copying paper 5 travels in the direction K'. Under such circumstances, the reel 22a serves as a take-up reel and is driven by a motor 25a via a linkage 25b. After all of the copying paper 5 has been wound onto the reel 22a following exposure of one of the strip-like portions 5a, 5b, the other strip-like portion 5b, 5a can be exposed by interchanging the reels 22a and 22b.

For the two modes of operation described with reference to FIG. 2, the lens unit 12 and mask 6 are fixedly mounted in the copying apparatus.

The invention allows development to be carried out more efficiently. Furthermore, the invention permits existing roll copiers to be employed for the production of small proofs without redesigning the guides for the copying paper even when such copiers can handle only copying paper which exceeds a predetermined width, e.g., a width of 2 inches.

Various modifications can be made within the meaning and range of equivalence of the appended claims.

We claim:

1. A copying method, comprising the steps of making a plurality of proofs corresponding to a plurality of coherent masters each of which has an identifying character associated therewith; and printing images of said characters on an image-recording medium so that said images of said characters have the same relative orientations as said characters, the making step including printing images of said masters on said image-recording medium so that said images of said masters have the same relative orientations as said masters.

2. The apparatus of claim 1, wherein said printing means comprises means for rotating images of masters in said first zone through 360 degrees.

3. The apparatus of claim 2, wherein said printing means comprises a Schmidt-Pechan prism.

4. A copying method, comprising the steps of conveying a plurality of coherent masters along a first path in a first direction; conveying an image-recording medium along a second path in a second direction counter to said first direction; and making a plurality of proofs corresponding to said plurality of coherent masters, said paths passing through a printing location, and the making step including printing images of said masters on said image-recording medium so that said images have the same relative orientations as said masters, said printing being performed at said location during the conveying steps.

5. A copying apparatus, comprising first means for positioning masters having identifying characters associated therewith in a first zone of a predetermined location; second means for positioning portions of an image-recording medium in a second zone of said location; and means at said location for printing in said second zone images of masters and identifying characters in said first zone such that the images of the masters have the same orientations as the masters and the images of the characters have the same orientations as the characters.

6. A copying apparatus, comprising first means for positioning masters in a first zone of a predetermined location, said first means including means for conveying a plurality of coherent masters along a first path in a predetermined direction, and said first path passing through said first zone; second means for positioning portions of an image-recording medium in a second zone of said location, said second means including means for conveying the image-recording medium along a second path in said direction, and said second path passing through said second zone; and means at said location for printing in said second zone images of masters in said first zone such that the images have the same orientations as the masters, said printing means constituting part of a means for making proofs of the masters on the image-recording medium.

7. A copying apparatus, comprising first means for positioning masters having identifying characters associated therewith in a first zone of a predetermined location; second means for positioning portions of an image recording medium in a second zone of said location; and means at said location for printing in said second zone images of masters and identifying characters in said first zone, said printing means constituting part of a means for making proofs of the masters on the image-recording medium, and said first means, second means and printing means permitting the images of the masters to have the same relative orientations as the masters and the images of the identifying characters to have the same relative orientations as the identifying characters.

8. A copying apparatus, comprising first means for positioning masters in a first zone of a predetermined location, said first means including first conveying means for conveying a plurality of coherent masters along a first path, and said first path passing through said first zone; second means for positioning portions of an image-recording medium in a second zone of said location, said second means including second conveying means for conveying the image-recording medium along a second path, and said second path passing through said second zone, at least one of said conveying means being reversible; and means at said location for printing in said second zone images of masters in said first zone, said printing means constituting part of a means for making proofs of the masters on the image-recording medium, and said first means, second means and printing means permitting the images to have the same relative orientations as the masters.

9. The apparatus of claim 8, wherein said one conveying means is said second conveying means.

10. The apparatus of claim 8, wherein said second path has a longitudinal center line and said printing means is arranged to print the images of masters in said first zone to one side of said center line.

11. The apparatus of claim 10, further comprising means along said first path for scanning the masters.

* * * * *